United States Patent
Joseph (10) Patent No.: US 10,021,210 B1
(45) Date of Patent: *Jul. 10, 2018

(54) PROVIDING FASTER DATA ACCESS USING MULTIPLE CACHING SERVERS

(71) Applicant: Amazon Technologies, Inc., Seattle, WA (US)

(72) Inventor: Infant Gerald Prasath Joseph, Bothell, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/815,637

(22) Filed: Nov. 16, 2017

Related U.S. Application Data (63) Continuation of application No. 14/223,699, filed on Mar. 24, 2014, now Pat. No. 9,854,053.

(51) Int. Cl.
*G06F 15/167* (2006.01)
*H04L 29/08* (2006.01)

(52) U.S. Cl.
CPC .............................. *H04L 67/2842* (2013.01)

(58) Field of Classification Search
CPC ........... H04L 29/08225; H04L 41/0246; H04L 29/08729
USPC ................................ 709/213, 203, 200, 226
See application file for complete search history.

(56) References Cited

U.S. PATENT DOCUMENTS

| | | | |
|---|---|---|---|
| 6,065,046 A | 5/2000 | Feinberg et al. | |
| 6,606,643 B1* | 8/2003 | Emens | H04L 29/06 709/200 |
| 8,176,141 B1* | 5/2012 | Lambert | H04L 67/2847 370/230 |
| 8,504,775 B2* | 8/2013 | Plamondon | G06F 17/30902 711/133 |
| 9,854,053 B1* | 12/2017 | Joseph | H04L 67/2842 |
| 2002/0120727 A1 | 8/2002 | Curley et al. | |
| 2003/0028694 A1 | 2/2003 | Aboulenein et al. | |
| 2010/0318632 A1 | 12/2010 | Yoo et al. | |
| 2015/0019916 A1 | 1/2015 | Kane | |

(Continued)

OTHER PUBLICATIONS

U.S. Appl. No. 14/223,699, "Final Office Action", dated Apr. 20, 2017, 12 pages.

(Continued)

*Primary Examiner* — El Hadji Sall
(74) *Attorney, Agent, or Firm* — Kilpatrick Townsend & Stockton LLP (57) ABSTRACT

A method and system for identifying an optimal server to receive requests for network content requested by a user of a network device is provided. A browser application in a network device receives a request for network content from a user and transmits the request to a server. The browser application receives the network content from the server and renders the network content to the user on the network device. Executable code in the rendered network content enables the browser application to identify an optimal server to receive subsequent items of network content requested by the user. When the user selects an item of network content in the rendered network page, the browser application connects to the optimal server to receive subsequent items of network content for the user.

20 Claims, 7 Drawing Sheets (56) References Cited

U.S. PATENT DOCUMENTS

2015/0149531 A1   5/2015   Wohlert et al.

OTHER PUBLICATIONS

U.S. Appl. No. 14/223,699, "Non-Final Office Action", dated Sep. 9, 2016, 7 pages.
U.S. Appl. No. 14/223,699, "Notice of Allowance", dated Aug. 30, 2017, 7 pages.
U.S. Appl. No. 14/223,699, filed Mar. 24, 2014, Titled: Providing Faster Data Access Using Multiple Caching Servers.

* cited by examiner

PROVIDING FASTER DATA ACCESS USING MULTIPLE CACHING SERVERS

CROSS-REFERENCE TO RELATED APPLICATIONS

This patent application is a continuation of U.S. patent application Ser. No. 14/223,699, filed on Mar. 24, 2014, now U.S. Pat. No. 9,854,053 issued on Dec. 26, 2017, entitled "PROVIDING FASTER DATA ACCESS USING MULTIPLE CACHING SERVERS," the content of which is herein incorporated by reference in its entirety.

BACKGROUND

Some caching servers are a network servers that save network content in network-accessible storage locations. By storing network content that was previously requested in these caching servers, access to the network content may be faster for subsequent requests for the same content. The demand on the bandwidth of a server that hosts the content may also be reduced. Since a caching server serves as a mechanism for the temporary storage of information, a request for information may typically be satisfied from the caching server. However, oftentimes a caching server may not store the requested information. As such challenges exist while managing caching servers and network content requests.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include providing faster data access to network content requested by a user in an environment including multiple caching servers. In accordance with at least one embodiment, a browser application on a client device receives a request for a first item of network content from a user. The network content may include, for example, a website, a search result, social media content, and/or other network content. In one embodiment, the browser application may transmit the request for the network content to a server (e.g., a base server). As described herein, a base server may be defined as a server that provides the originally published network content and, in some examples, may host and/or manage the network content (e.g., a web server). In some examples, in response to the request, the server may provide a network page that includes the first item of network content, which may then be rendered by the browser application to the user on the client device.

In some embodiments, the browser application may transmit a plurality of requests for a second item of network content to a plurality of servers at substantially the same time, in response to execution of executable code in the network content rendered to the user. The plurality of servers may, in some examples, include the base server as well as one or more caching servers. The browser application may receive a plurality of responses from the plurality of servers, each including the second item of network content. In one embodiment, each of the responses may be associated with distinct round trip latencies related to the plurality of servers (e.g., a first round trip latency may correspond to a response from the base server, a different round trip latency may correspond to a first cache server, etc.). In certain embodiments, the browser application may then be configured to determine an optimal server from the plurality of servers based on the different round trip latencies. The browser application may then be configured to select the optimal server to receive subsequent requests for subsequent items of the network content requested by the user.

In at least one non-limiting example, a user on a computing device searches for, or browses for network content (e.g., websites, search results, social media content, etc.) via a browser application on the user's computing device. The browser application receives the request and transmits the request to a first contact server (e.g., a base server) that may host, manage and/or provide the network content as well as multiple cache servers (e.g., requesting the same content from each of a plurality of servers). The base server may return a network page to the browser application. When the browser application receives the network page, executable code in the form of Javascript® may enable the browser application to identify an optimal server from which to request subsequent items of network content requested by the user. That is, the executable code may enable the browser to identify whether to request subsequent content from the base server or one of the cache servers. This identification may be determined based at least in part on the round trip latencies associated with each response (e.g., corresponding to each server, respectively). When the user clicks on an item of network content in the rendered network page, the browser application connects to the optimal server to receive the subsequent items of network content for the user.

Figure 1:
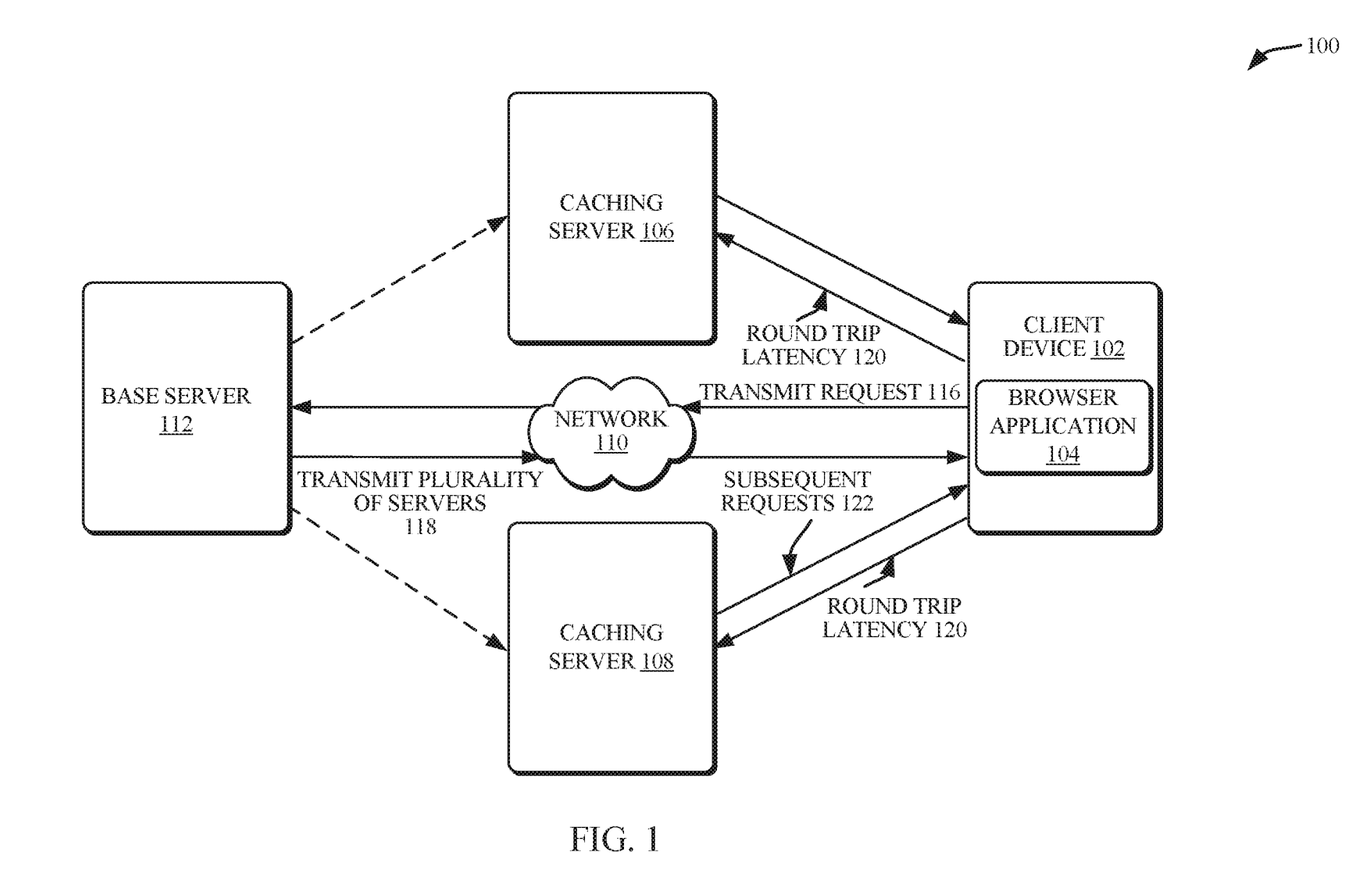
FIG. 1 depicts aspects of an example system architecture 100 in accordance with at least one embodiment of the present disclosure.

FIG. 1 depicts aspects an example system architecture 100 in accordance with at least one embodiment of the present disclosure. The architecture 100 includes a client device 102 communicatively connected to a base server 112 and a plurality of servers (e.g., 106, 108) via a network 110. In architecture 100, one or more users may utilize the client device 102 to access a browser application (e.g., a web browser) 104 or a user interface accessible through the browser application 104 to search for, or browse for network content (e.g., websites, a search engine, a social media service, and/or other network content). As an example, a user may search for, or browse for network content by typing a web address or a Uniform Resource Locator (URL) of the network content into the browser's address bar or by submitting a search query for the network content via a search engine.

In accordance with at least one embodiment, the browser application 104 may receive a request for network content from a user and transmit the request 116 to the base server 112, which, in some examples, may host, manage and/or provide the network content. In some examples, the base server may be defined as a server that provides the originally published network content. In embodiments, in response to the request, the base server 112 may return a network page that describes the network content to the browser application 104. As described herein, the network page may include hypertext information (e.g., information formatted in accordance with a hypertext markup language such as HTML) about the information queried by the user. Additionally, the network page may include content such as graphics, images and illustrations that describe the page and executable code in the form of Java scripts that specify certain operations to be executed by the browser application 104 when the network page is rendered to the user on the client device 102.

In some examples, the base server 112 may identify a plurality of servers 118 (e.g., a first set of candidate servers) connected to the network 110 and transmit the identity and/or network location of the plurality of servers 118 to the browser application 104. The plurality of servers 118 may be identified by the base server 112 in various ways. For example, the base server 112 may identify the plurality of servers 118 based at least in part on a geographical location of the plurality of servers and/or network topology. As an example, the base server 112 may be configured with a set of location probes that continuously monitor server availability and server load information in an identified region and provide this information to the base server 112. In some examples, the server load may be defined as the number of processes waiting in a queue to access the server and/or as a number of service requests received during a time period (e.g., a unit time period) and may be represented by a numerical value. For example, if the server load value of a server is within a pre-defined threshold value (e.g., 1.00), the base server 112 may identify the server as one of the plurality of servers 118. In other examples, the base server 112 may also identify the plurality of servers 118 based on prior static knowledge of hop distances. The hop distance, in some examples, may refer to the number of intermediate servers through which data must pass to reach the base server. In some embodiments, the plurality of servers 118 transmitted by the base server 112 may include identification information related to the servers such as the name of the server, the Internet Protocol (IP) address of the server, and the like. In some examples, the plurality of servers 118 identified by the base server 118 may include a plurality of caching servers (e.g., 106 and 108). As described herein, a caching server may refer to a server that stores frequently requested Internet or other network content in temporary storage and may typically be physically located closer to the client device 102 than the base server 112.

In some embodiments, when the browser application 104 renders the network page on the client device 102, the executable code in the network page instructs the browser application 104 to transmit a plurality of requests for an item of the network content to the plurality of servers 118 specified by the base server 112. As an example, an item of network content may include the most frequently visited network page in the network content rendered to the user, the most popular link in the network content, the link popularity and the like. In one embodiment, the plurality of servers 118 may include one or more caching servers, 106 and 108. It should be appreciated that while the implementation depicted in FIG. 1 illustrates caching servers 106 and 108, the base server 112 may identify additional caching servers or a different set of caching servers to transmit requests to, in other embodiments.

In certain embodiments, the browser application 104 may be configured to transmit the plurality of requests for the item of network content substantially simultaneously to the plurality of servers, using a plurality of network probe sensors. In one example, and as shown in FIG. 1, the network probe sensors may be configured to transmit requests to the caching servers 106 and 108 to measure the round trip latency 120 of the caching servers (e.g., 106 and 108).

In one embodiment, the round-trip latency may be defined as the length of time taken by the browser application 104 to send a request for an item of network content to the plurality of caching servers (e.g., 106 and 108) and to receive a response including the item of network content from the plurality of caching servers (e.g., 106 and 108). Various techniques may be utilized by the network probe sensors to measure the round trip latency. In some examples, the network probe sensors may be configured to transmit a plurality of light-weight probe requests to the plurality of caching servers (e.g., 106 and 108) to measure the round trip latency. A light-weight probe request, as discussed herein, may measure the round trip latency by determining the amount of time taken by the browser application 104 to download the first several bytes (e.g., 1, 2, 3, 5, 10, 20, 50 bytes) of the item of network content from the plurality of servers in contrast to downloading the entire item of network content (i.e., in contrast to a full-weight content request). In other examples, the network probe sensors may also be configured to transmit one or more full-page probe requests to the plurality of servers to measure the round trip latency. A full-page probe request, as discussed herein, may measure the round trip latency by determining the amount of time it takes the browser application 104 to download an entire network page from the plurality of servers.

In some embodiments, the network probe sensors may also measure the round trip latency based at least in part on determining the amount of network content in a network page corresponding to the item of network content. For example, if a network page is sparse, downloading network content may require as few as two or three round-trips between the client device 102 and the plurality of caching servers (e.g., 106 or 108) but may require several round-trips if the network page has a rich appearance. It should be appreciated that in certain situations, the caching servers (e.g., 106 and 108) may not have a stored copy of the network content. In this situation, the network probe sensors may also be configured to relay the request to the base server 112, which in turn may provide the network content to the browser application 104.

In some embodiments, the browser application 104 may then be configured to receive a plurality of responses from the plurality of servers that include the network content. In examples, when a light-weight probe request is transmitted by the browser application, the plurality of responses received from the plurality of servers may include the first several bytes (e.g., 1, 2, 3, 5, 10, 20, 50 bytes) of the item of network content. Similarly, when a full-page probe request is transmitted by the browser application, the plurality of responses received from the plurality of servers may include an entire network page.

In some examples, individual responses of the plurality of responses may be associated with individual round trip latencies (as measured by the network probe sensors discussed above) and the browser application 104 may be configured to store the round trip latencies in a cookie. As described herein, a cookie may refer to a piece of information sent from the plurality of servers to the browser application when the browser application requests for network content from the plurality of servers. The piece of information may be stored as in a cookie format in the browser application and/or on a storage device that is local to the browser application 104 with respect the network while the user browses the network content. The information may include, for example, individual round trip latencies of the plurality of servers, information that identifies the user and/or information that identifies the user's search session.

The browser application 104 may then be configured to identify an optimal server from the plurality of servers 118 based at least in part on the individual round trip latencies. In one example, the optimal server may be identified by the browser application 104 as a server with an optimal round trip latency. As an example, a server with an optimal round trip latency may be identified as a server with the minimum round trip latency. The browser application 104 may then be configured to select the optimal server (e.g., caching server 108 as illustrated in FIG. 1) to receive subsequent requests 122 for subsequent items of network content (for e.g., when the user clicks on a link displayed in the rendered network page).

The identification of an optimal server that stores the network content by the browser application enables the browser application to connect to the optimal server in a single hop. Thus, the browser application may not need to make additional hops to obtain requested network content by first attempting to contact a server for the network content which in turn may relay the request to other servers if the server has not stored the network content. Accordingly, the determination and selection of an optimal server by the browser application, in accordance with embodiments, may minimize network delays for an end-user browsing for the network content and improve overall network performance.

In some embodiments, the browser application 104 may be configured to determine a lock-in period for the optimal server. One or more subsequent requests by the user for additional network content may be served using the optimal server, for the duration of the lock-in period. In one embodiment, the lock-in period may define a length of time that the browser application 104 may be configured to utilize the optimal server for receiving the network content. Thus, in some examples, the optimal server may not be re-determined during the lock-in period. In one example, the lock-in period may be pre-determined by the browser application 104 as a fixed value. In other examples, the lock-in period may be dynamically determined by the browser application 104 based on a plurality of factors. These factors may include, for example, past web page load times experienced by the optimal server, the typical number of requests per second handled by the optimal server, the typical load time experienced by the optimal server at various load levels, and the like. In some embodiments, the lock-in period of the optimal server may be determined by probing the optimal server at fixed-intervals of time to determine if there are updates to the performance data related to the optimal server. As an example, if the optimal server is probed at fixed intervals of time (e.g., once every 10 minutes), then, in one embodiment, the lock-in period of the optimal server may be determined to be 10 minutes. In some examples, the lock-in period of the optimal server may be dynamically adjusted based on the probing. As an example, if it is determined that updates to the historical data are received only once every hour, then the lock-in period may be dynamically adjusted to one hour, instead of 10 minutes.

In some embodiments, the browser application may then utilize the optimal server (e.g., caching server 108) to receive subsequent items of network content during the lock-in period. In some embodiments, the optimal server may also be configured to transmit the identity and/or network location of a second set of candidate servers to the browser application 104. The optimal server may be configured to identify the second set of candidate servers in a manner similar to the plurality of servers 118 identified by the base server 112 as discussed above. In some embodiments, when a network page received from the optimal server is rendered by the browser application 104, executable code in the network page may provide the browser application 104 with the second set of candidate servers. In some examples, the second set of candidate servers may identify a second set of servers that the browser application 104 may connect to, to receive subsequent requests for an item of network content for the user. The second set of candidate servers may include a different set of caching servers from the plurality of servers (e.g., 118) identified by the base server or may include caching servers in addition to the plurality of servers (e.g., 118). Thus, in some embodiments, at the end of the lock-in period of the optimal server, the browser application 104 may repeat the process of transmitting network probe requests as discussed above to the second set of candidate servers determine a new optimal server with a new lock-in period, to receive subsequent requests for the network content, for the user.

Figure 2:
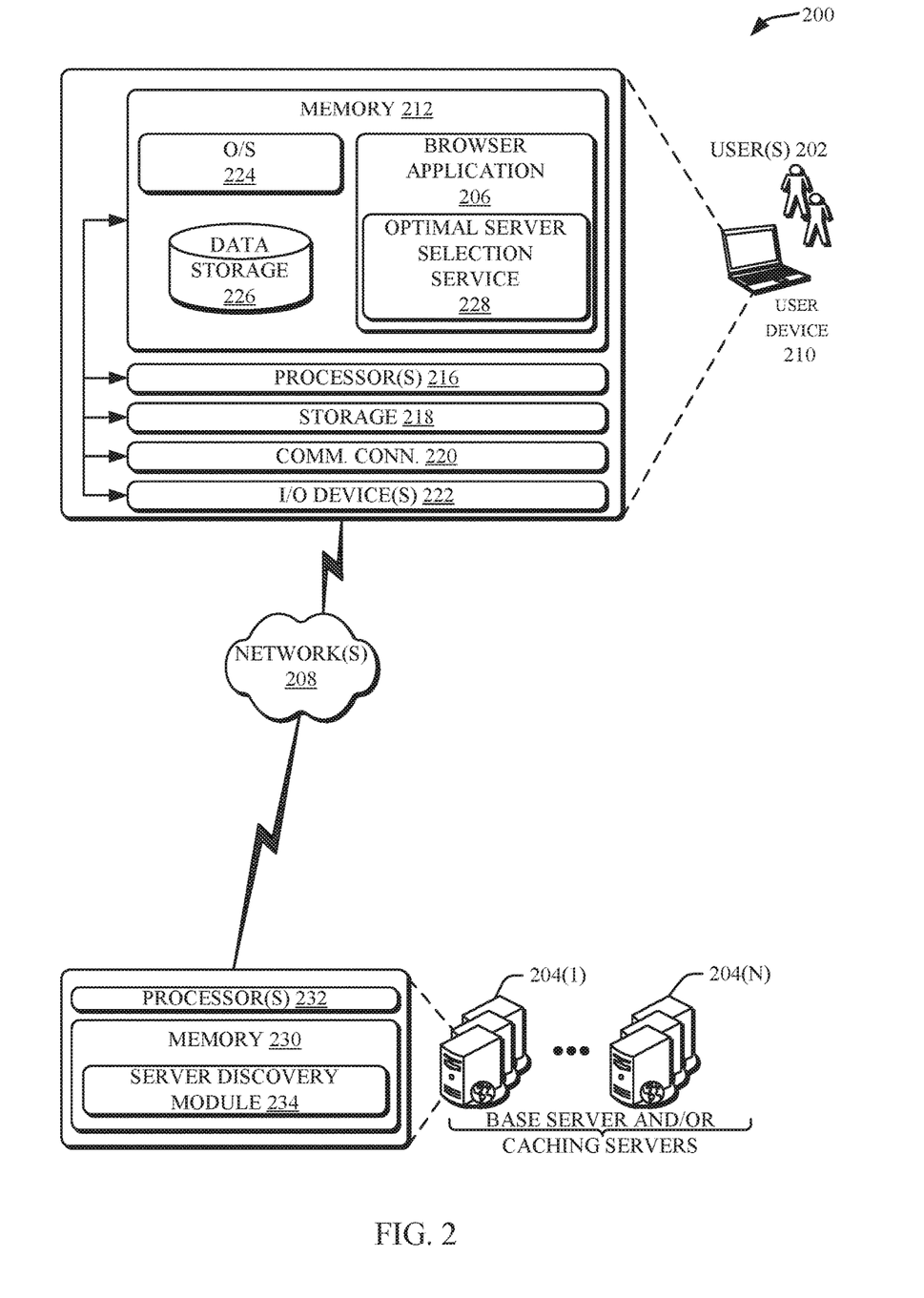
FIG. 2 depicts an illustrative system or architecture 200 that depicts aspects of an optimal server selection service, described herein.

FIG. 2 depicts an illustrative system or architecture 200 that depicts aspects of an optimal server selection service, described herein. In architecture 200, one or more users 202 (i.e., web browser users) may utilize a user computing device 210 to access a browser application 206 (e.g., a web browser) or a user interface accessible through the browser application 206 via one or more networks 208. In some examples, the networks 208 may include any one or a combination of many different types of networks, such as cable networks, the Internet, wireless networks, cellular networks and other private and/or public networks.

In some aspects, the browser application 206 may be configured to receive, store, and/or display network content (e.g., websites, a search engine, a social media service, and/or other network content) by interacting with a base server and/or one or more caching servers, 204(1)-(N) (collectively, referred to herein as, servers 204). In some embodiments, the servers 204, perhaps arranged in a cluster of servers or as a server farm, may host the network content and/or other cloud-based software services. Other server architectures may also be used to host the network content and/or cloud-based software services. The servers 204 may, in some examples, provide computing resources such as, but not limited to, data storage, data access, management, virtualization, cloud-based software solutions, electronic content performance management, and the like. The servers 204 may also be operable to provide web hosting, computer application development, and/or implementation platforms, combinations of the foregoing, or the like to the one or more users 202.

As described briefly above, the browser application 206 may allow the users 202 to search for, or browse for network content by typing a web address or a Uniform Resource Locator (URL) of the network content into the browser's address bar or by submitting a search query for the network content via a search engine. The browser application 206 may be capable of handling requests from many users 202 and serving, in response, various user interfaces that can be rendered at the user devices. In one example, the browser application 206 may be capable of receiving search queries from one or more users 202, and in response to the search queries, render network content (e.g., a network page) that includes hypertext information (e.g., information formatted in accordance with a hypertext markup language such as HTML) about the information queried by the user. In addition to accessing the browser application 206 to view network content, the users 202 may also utilize one or more native applications (e.g., a software application program) developed for use on a particular platform compatible with the user devices 208 to access the network content. The browser application 206 can also provide any type of website that supports user interaction, including search engine sites. The described techniques may similarly be implemented outside of the browser application 206, such as with other applications running on the user device 202.

In one illustrative configuration, the servers 204 may include at least one memory 230 and one or more processing units (or processor(s)) 232. The processor(s) 232 may be implemented as appropriate in hardware, computer-executable instructions, firmware, or combinations thereof. Computer-executable instruction or firmware implementations of the processor(s) 232 may include computer-executable or machine-executable instructions written in any suitable programming language to perform the various functions described.

The memory 230 may store program instructions that are loadable and executable on the processor(s) 232, as well as data generated during the execution of these programs. Depending on the configuration and type of servers 204, the memory 232 may be volatile (such as random access memory (RAM)) and/or non-volatile (such as read-only memory (ROM), flash memory, etc.). The servers 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 230 may include multiple different types of memory, such as static random access memory (SRAM), dynamic random access memory (DRAM), or ROM.

Turning to the contents of the memory 230 in more detail, the memory 230 may include an operating system and one or more application programs, modules, or services for implementing the features disclosed herein, such as a server discovery module 234. In one embodiment, the server discovery module 234 may be configured to identify a plurality of servers and transmit the identity and/or network location of the plurality of servers (e.g., 118) to the browser application 104. In embodiments, the servers 204 may transmit the entire service provided by the server discovery module 234, which may include and/or be configured with the plurality of servers. In one embodiment, the server discovery module 234 may be configured with a set of location probes that continuously monitor server availability and server load information of servers in an identified region. In some examples, the server discovery module 234 may be configured to identify the plurality of servers based on server location and/or network topology. In other examples, the server discovery module 234 may be configured to identify the plurality of servers based on prior static knowledge of hop distances, as discussed in relation to FIG. 1.

In some aspects, the servers 204 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in accordance with at least one embodiment, the service provider computers may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the servers 204 may be in communication with the user device 210 and/or other servers via the networks 208, or via other network connections.

The user device 210 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device 210 may be in communication with the servers 204 via the networks 208, or via other network connections. Additionally, the user device 210 may be part of the distributed system managed by, controlled by, or otherwise part of the servers 204.

In one illustrative configuration, the user device 210 may include at least one memory 212 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described.

The memory 212 may store program instructions that are loadable and executable on the processor(s) 216, as well as data generated during the execution of these programs. Depending on the configuration and type of the user device 210, the memory 212 may be volatile (such as RAM) and/or non-volatile (such as ROM, flash memory, etc.). The user device 210 may also include additional storage 218, which may include removable storage and/or non-removable storage. The additional storage 218 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 212 may include multiple different types of memory, such as SRAM, DRAM, or ROM.

The memory 212, the additional storage 218, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 212 and the additional storage 218 are all examples of computer storage media. Additional types of computer storage media that may be present in the user device 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the user device 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The user device 210 may also contain communications connection(s) 220 that allow the user device 210 to communicate with a stored database, another computing device or server, user terminals and/or other devices on the networks 208. The user device 210 may also include I/O device(s) 222, such as a keyboard, a mouse, a pen, a voice input device, a touch input device, a display, speakers, a printer, etc.

Turning to the contents of the memory 212 in more detail and will be described in further detail in FIG. 3, the memory 212 may include an operating system 224, one or more data stores 226 and a browser application 206. In one embodiment, the browser application 206 may be configured to establish an execution environment for implementing one or more application programs, modules, or services, including an optimal server selection service, 228, described herein. In one embodiment, the browser application 328 may be configured to execute the optimal server selection service 228 when the network content is rendered to the user. In certain embodiments, the optimal server selection service 228 may include executable code in the form of Javascript® that specify one or more operations to be performed by the browser application 328 to identify an optimal server to receive subsequent requests for items of network content.

Figure 3:
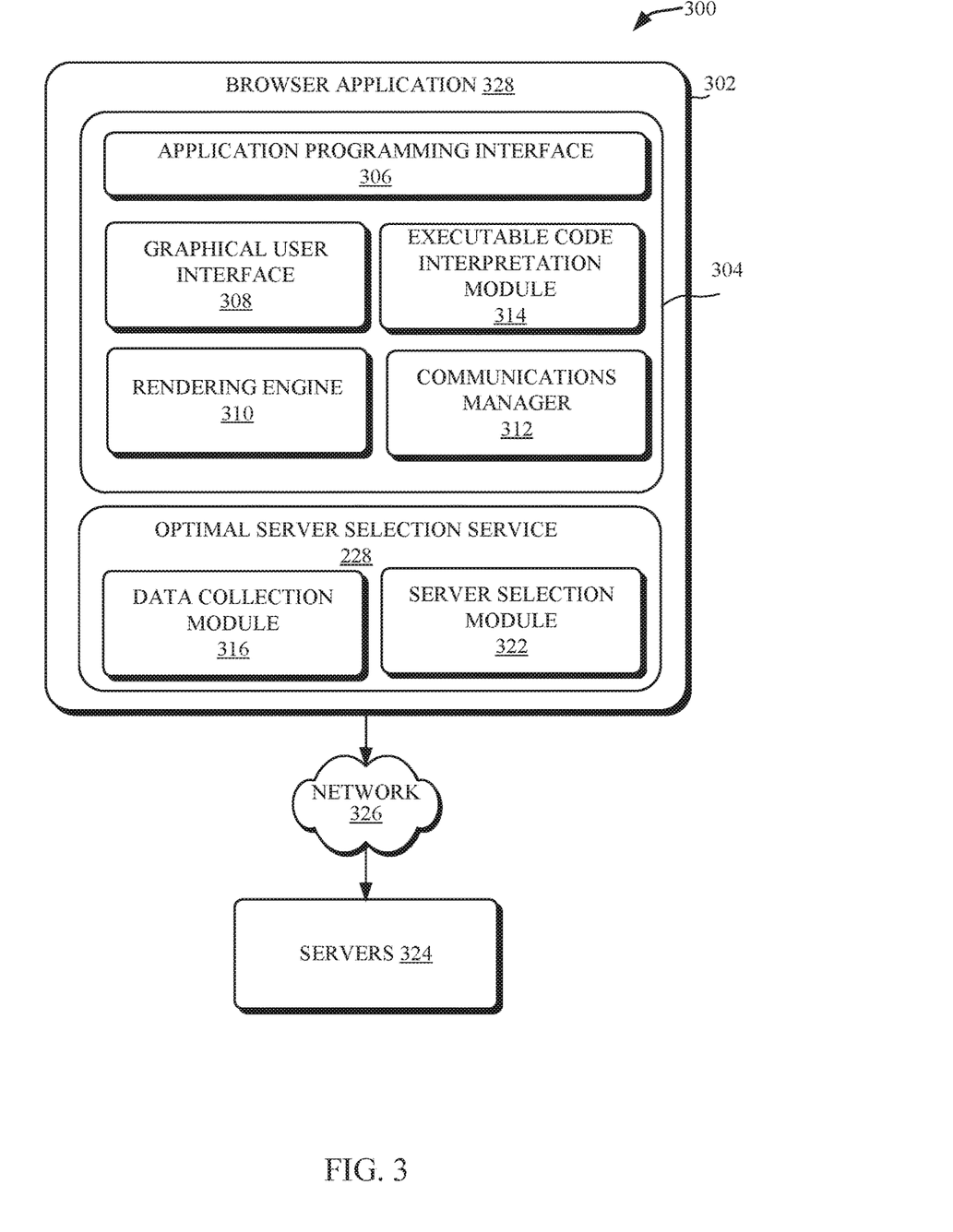
FIG. 3 illustrates an example execution environment 300 of an optimal server selection service established by a browser application in a user computing device, in accordance with at least one embodiment of the present disclosure.

FIG. 3 illustrates an example execution environment 300 provided by a browser application 328 in a user computing device, in accordance with at least one embodiment of the present disclosure. The browser application 328 may be the same or similar to the browser application (e.g., 104, 206) discussed in relation to FIG. 1. In one embodiment, the browser application 328 may include a plurality of modules. The modules 304 may be software modules, hardware modules, or a combination thereof. If the modules 304 are software modules, the modules 304 can be embodied on a computer readable medium and processed by a processor in any of the computer systems described herein. It should be noted that any module or data store described herein, may be, in accordance with at least one embodiment, a service responsible for enabling the selection of an optimal server for a browser application on the user's device 302 to communicate with while serving requests for network content, received from one or more users of the user device 302. The modules may be configured in the manner suggested in FIG. 3 or may exist as separate modules or services external to the user device 302.

In accordance with at least one embodiment, the browser application 328 may include a browser application programming interface (API) 306 and a graphical user interface 308. In some embodiments, the graphical user interface 308 may be configured to implement various user interface elements that can be rendered on the user's browser application (e.g., 104 or 206) at the user device 302. In accordance with at least one embodiment, the graphical user interface 308 may be configured to implement one or more user interface elements to enable users on device 302 to interact with one or more servers 324 while searching for, or browsing for network content. As an example, a user may utilize a user interface element to submit a search query. The search query may be received by the communications manager 312 and transmitted to the servers 324 via a network 326. In some examples, the network 326 may be the same or similar to networks 110 and 208 discussed in relation to FIG. 1. The servers 324 may be the same or similar to the servers 204 discussed in relation to FIG. 2.

In some embodiments, the rendering engine 310 may be configured to receive the network content from the servers 324 and render the network content (e.g., a network page) to the user. In one embodiment, the rendered network page may include hypertext information (e.g., information formatted in accordance with a hypertext markup language such as HTML) about the information queried by the user. As discussed above, in some embodiments, the network page may also include additional content such as graphics, images and illustrations that describe the page and executable code in the form of Java scripts that specify certain operations to be executed by the browser application (e.g., 104 or 206) when the network page is rendered to the user. In one embodiment, and as discussed in relation to FIGS. 1 and 2, the network content received from the servers may include identification information related to a plurality of servers that the browser application may contact to receive future requests for network content, for the users.

In accordance with at least one embodiment, the optimal server selection service 228 may include an executable code interpretation module 314. In some embodiments, the executable code interpretation module 314 may be configured to identify the plurality of servers (e.g., 118) from the executable code in the network page rendered to the user. The identification information may include for example, the name of the server, the Internet Protocol (IP) address of the server, and the like. In some examples, and as shown in FIG. 3, the executable code interpretation module 314 may be resident in the browser application 206. In other examples, the executable code interpretation module 314 may also be implemented as a plug-in module that may be loaded into the browser application 206 when the network page is rendered to the user.

In accordance with at least one embodiment, the browser application 328 may include an optimal server selection service 228. In one embodiment, the executable code interpretation module 314 in the browser application 328 may be configured to execute the optimal server selection service 228 when the network content is rendered to the user. In certain embodiments, the optimal server selection service 228 may include executable code in the form of Javascript® that include one or more operations to be performed by the browser application 328 to identify the optimal server.

In one embodiment, the optimal server selection service 228 may include a data collection module 316 and a server selection module 322. The data collection module 316 may be configured to transmit a plurality of requests to the plurality of servers (e.g., 118) identified by the executable code interpretation module 314. In one embodiment, the data collection module 316 may be configured with a plurality of network probe sensors. The plurality of network probe sensors may be configured to determine the round trip latency related to the plurality of servers and store information related to the round trip latency in a cookie. The manner in which the network probe sensors may determine the round trip latency is discussed in detail in relation to FIG. 1.

In accordance with at least one embodiment, the server selection module 322 may be configured to retrieve the round trip latency of the plurality of servers and identify an optimal server based at least in part on the round trip latency. In one embodiment, the server selection module 322 may be configured to select the optimal server as a server with the minimum round-trip latency. In some embodiments, optimal server selection module 322 may be configured to determine a lock-in period for the optimal server. As discussed in relation to FIG. 1, the lock-in period may define a length of time that the browser application may be configured to utilize the optimal server while receiving requests for the network content, for the user. The manner in which the lock-in period may be determined is discussed in detail in relation to FIG. 1.

Figure 4:
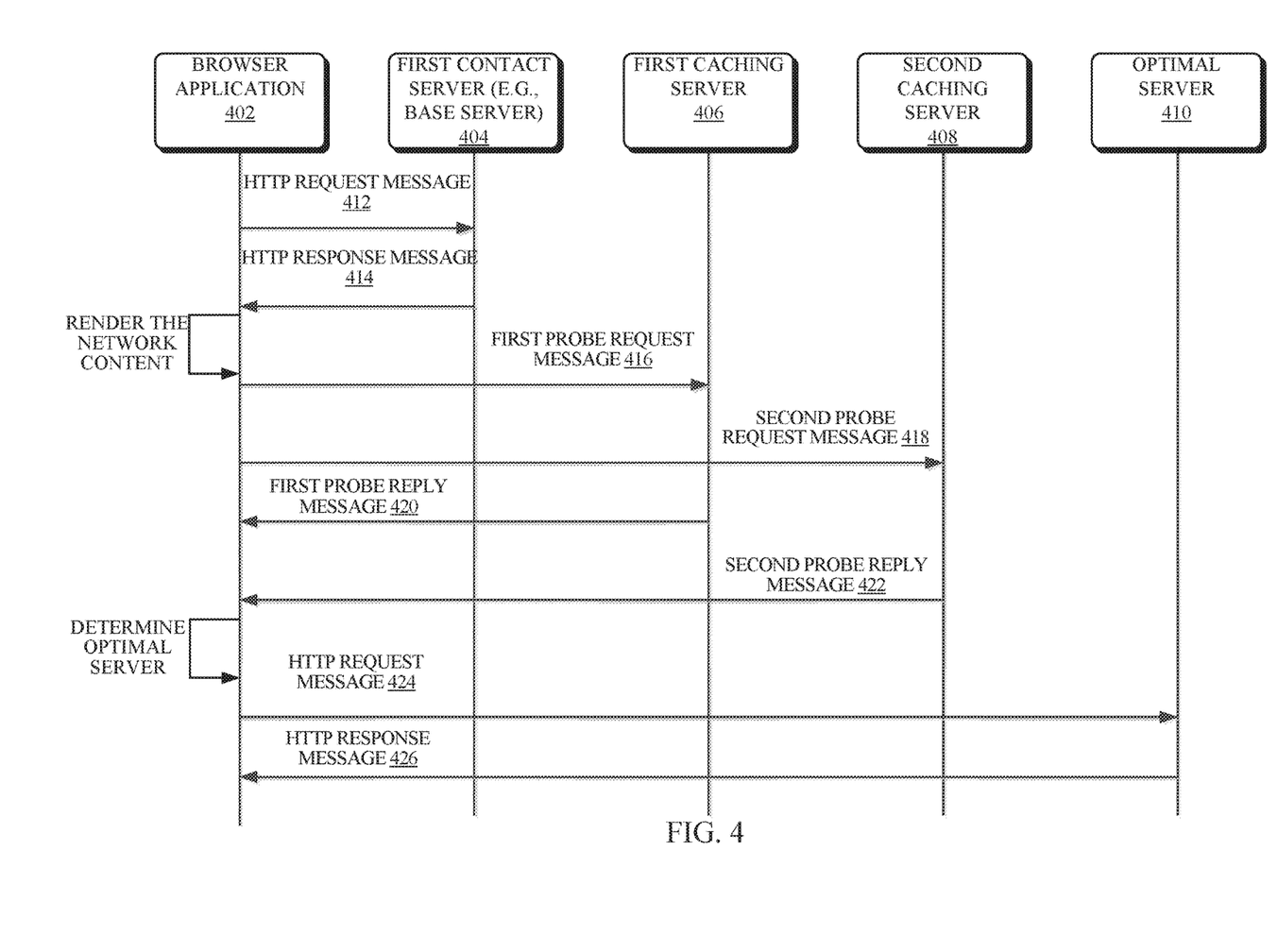
FIG. 4 depicts an example sequence diagram of the steps performed by an optimal server selection service in the browser application of a user computing device, in accordance with one embodiment.

FIG. 4 depicts an example sequence diagram of the steps performed by the browser application of a user computing device, in accordance with one embodiment of the present disclosure. Although in this example, a particular protocol (hypertext transfer protocol or HTTP) is referenced, in accordance with at least one embodiment, any suitable network content protocol may be utilized. The sequence diagram depicted in FIG. 4 is only an example of the operations performed by the browser application 402 and is not intended to be limiting. In one example, the steps performed by the browser application 402 may be as follows:

(1) The browser application 402 receives a request for a first item network content from a user and transmits a HTTP request message 412 to a first contact server 404 (e.g., the base server).
(2) The browser application 402 receives a HTTP response message 414 from the first contact server 404. In examples, the HTTP response message 414 may include the first item of network content and the identity and/or network location of a plurality of servers. The browser application 402 may then render the first item of network content to the user.
(3) The browser application 402 then transmits a first probe request message 416 to a first caching server 406. In some examples, the first probe request message 416 may include a request for a second item of network content from the first caching server 406. In some examples, the first probe request message 416 may also include a request to determine the round trip latency of first caching server 406.
(4) In some examples, substantially simultaneously, the browser application 402 may also transmit a second probe message 418 to a second caching server 408. In some examples, the second probe request message 418 may include a request for the second item of network content from the second caching server 406.
(5) In some examples, the second probe request message 418 may also include a request to determine the round trip latency of second caching server 408. The browser application 402 receives a first probe reply message 420 from the first caching server 406. In one example, the first probe reply message 420 may include the second item of network content and round trip latency of the first caching server 406.
(6) The browser application 402 receives a second probe reply message 422 from the second caching server 408. In one example, the second probe reply message 422 may include the second item of network content and the round trip latency of the second caching server 408.
(7) The browser application then determines an optimal server based on the round trip latency of the first caching server 406 and the second caching server 408.
(8) The browser application transmits a HTTP request message 424 to the optimal server.
(9) The browser application receives a HTTP response message 426 that includes subsequent items of network content from the optimal server.

Figure 5:
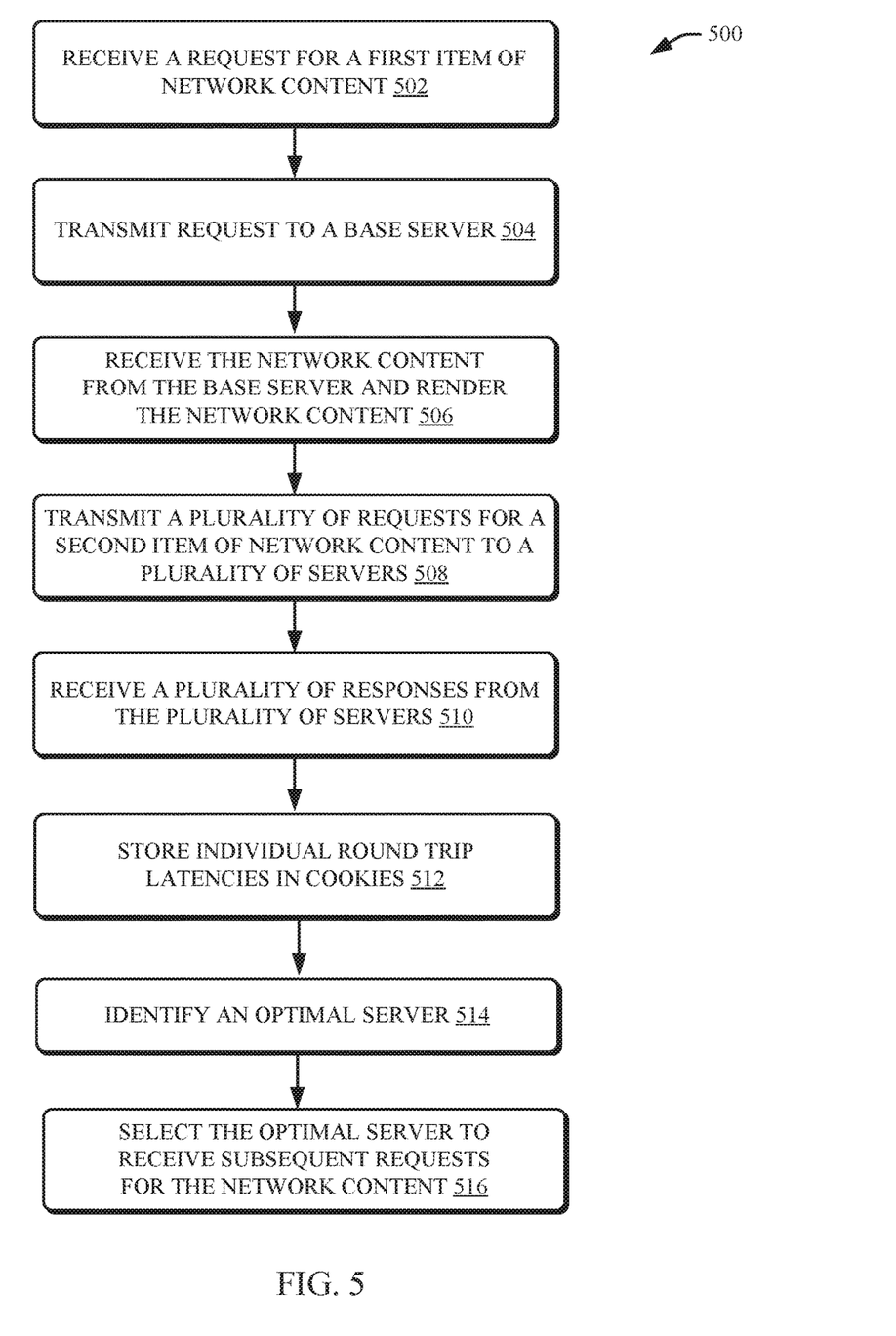
FIG. 5 illustrates a flow diagram of an example process 500 for identifying an optimal server, in accordance with one embodiment of the present disclosure.
Figure 6:
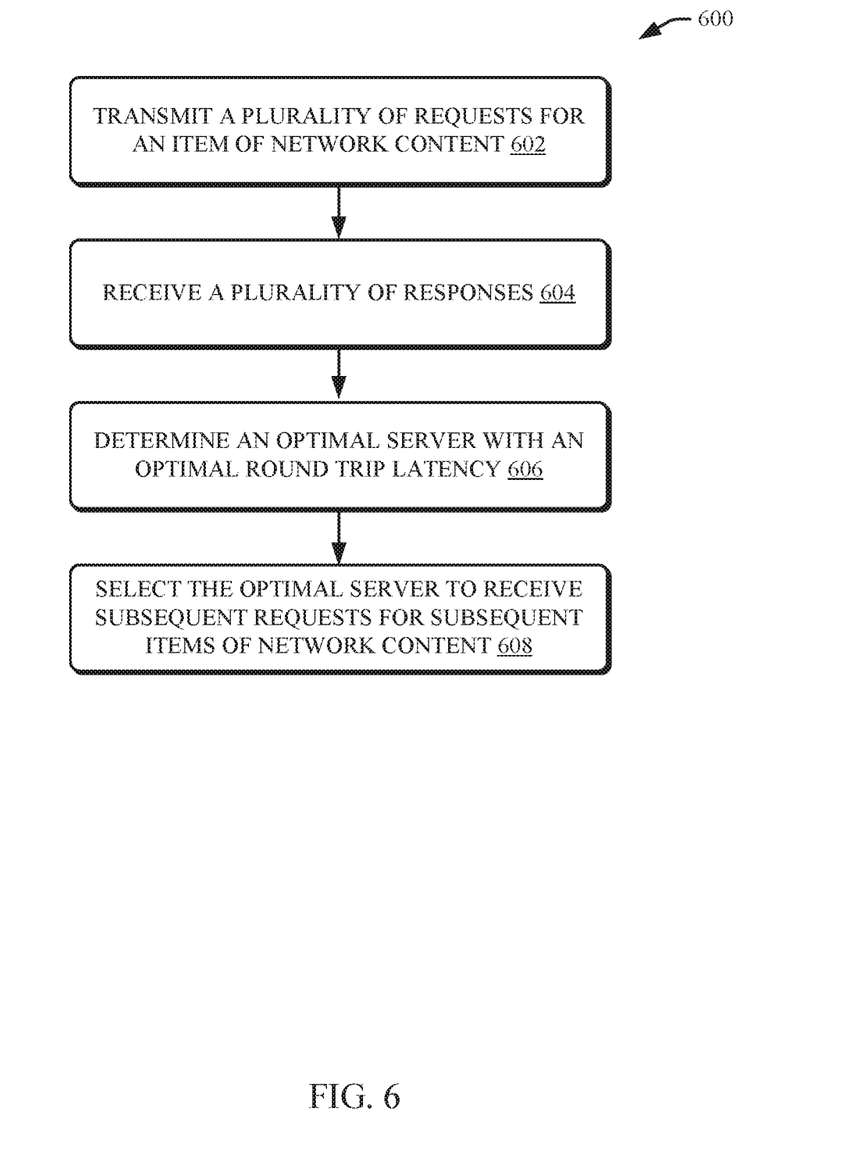
FIG. 6 illustrates a flow diagram of an example process 600 for identifying an optimal server in accordance with another embodiment of the present disclosure.

FIGS. 5-6 illustrate example flow diagrams showing respective processes 500 and 600 for identifying an optimal server, described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

In some examples, the optimal server selection service 226 (e.g., utilizing at least the executable code interpretation module 314, the data collection module 316 and the server selection module 322) shown in at least FIG. 3 (and others) may perform the processes 500 and 600 of FIG. 5 and FIG. 6 respectively.

FIG. 5 illustrates a flow diagram of an example process 500 for identifying an optimal server, in accordance with one embodiment of the present disclosure. The process at 500 may begin at 502 by receiving a request for a first item of network content from a user accessing a browser application on a user computing device. The network content may include, for example, websites, a search engine, a social media service, and/or other network content. At 504, the process 500 may include transmitting the request to a first contact server (e.g., a base server 112). At 506, the process 500 may include receiving the first item of network content from the first contact server and rendering the first item of network content to the user via the browser application.

In some embodiments, at 508, the process 500 may include transmitting, responsive to execution of the executable code, a plurality of requests for a second item of network content to the plurality of servers. The second item of network content, in some examples, may include the most frequently visited network page in the network content rendered to the user, the most popular link in the network content, the link popularity, and the like. In some examples, the plurality of requests may be transmitted by a plurality of network probe sensors, and may include light-weight probe requests and full-page probe requests as discussed in relation to FIG. 1. At 510, the process 500 may include receiving, from the plurality of servers, a plurality of responses including the second item of network content. In some examples, the individual responses of the plurality of responses are associated with individual round trip latencies. In some examples, the plurality of network probe sensors may measure the round trip latencies.

In some embodiments, at 512, the individual round trip latencies are stored in a cookie by the browser application. At 514, an optimal server is identified based at least in part on the individual round trip latencies. At 516, the optimal server is selected to receive subsequent requests for network content.

FIG. 6 illustrates a flow diagram of an example process 600 for identifying an optimal server in accordance with another embodiment of the present disclosure. The process at 600 may begin at 602 by transmitting substantially simultaneously from a network client, a plurality of requests for an item of network content to a plurality of servers. At 604, the process 600 may include receiving, from the plurality of servers, a plurality of responses including the network content. In some examples, the individual responses of the plurality of responses may be associated with distinct round trip latencies. At 606, the process 600 may include determining, by the network client, an optimal server of the plurality of servers associated with an optimal round trip latency. In some examples, the optimal server may be identified as a server of the plurality of servers having minimum round trip latency. In some embodiments, at 608, the process 600 may include selecting, by the network client, the optimal server to receive subsequent requests for subsequent items of the network content.

Illustrative methods and systems for identifying an optimal server to receive requests for network content requested by users of a network device are described above. Some or all of these systems and methods may, but need not, be implemented at least partially by architectures such as those shown at least in FIGS. 1-6 above.

Figure 7:
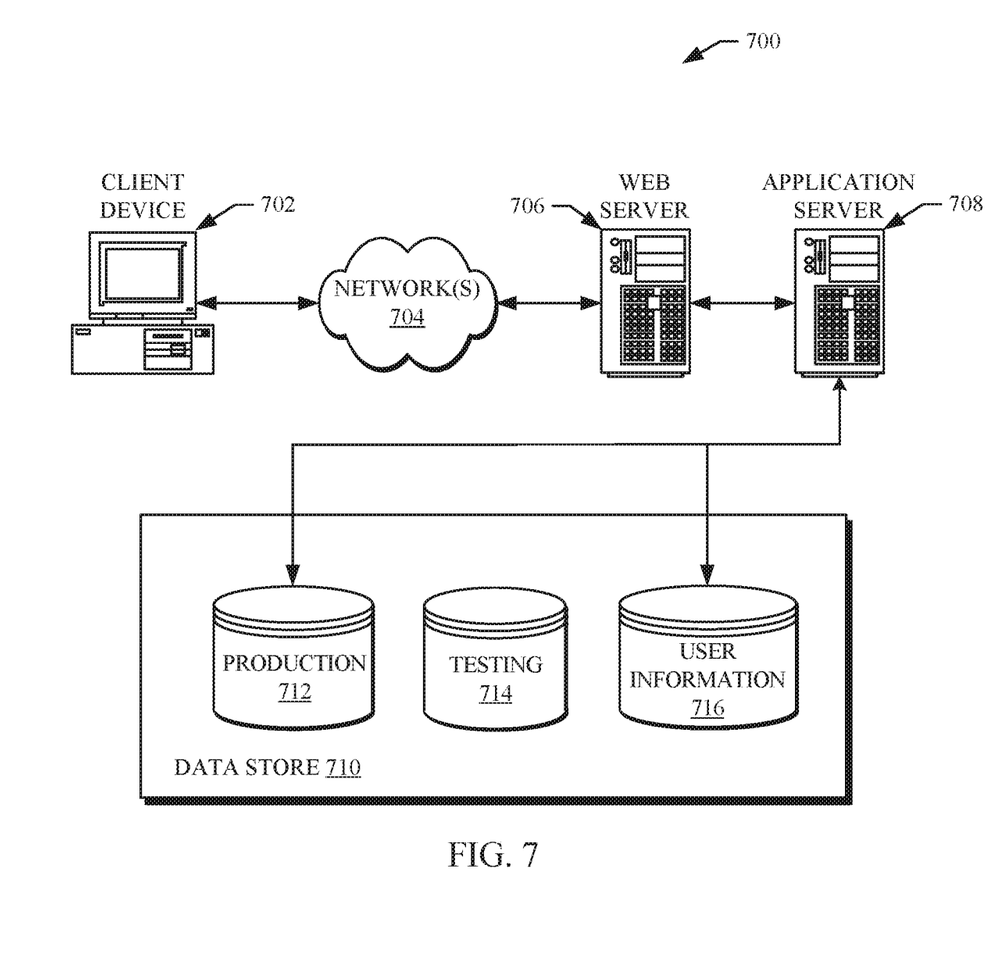
FIG. 7 illustrates aspects of an example environment 700 for implementing aspects in accordance with various embodiments.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in accordance with at least one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   in response to receiving a request for an item of network content from a network client, identifying a plurality of servers having access to the network content, the plurality of servers comprising at least a base server and one or more cache servers;
   generating a content request for the item of network content;
   transmitting the content request for the item of network content to individual servers of the plurality of servers in parallel;
   receiving, from at least a subset of the plurality of servers, a plurality of responses to the content request that comprises at least a portion of the item of network content;
   determining, for individual responses in the plurality of responses, a round trip latency for the content request based at least in part on an amount of time to receive the response;
   determining that an optimal server of the plurality of servers is associated with a received response having the lowest round trip latency of the plurality of responses; and
   determining a lock-in period for the network client, wherein one or more subsequent requests received from the network client are transmitted to the optimal server during the lock-in period.

2. The computer-implemented method of claim 1, wherein the lock-in period is determined based at least in part on historical performance data related to the optimal server.

3. The computer-implemented method of claim 2, wherein the historical performance data is obtained by probing the optimal server at fixed-intervals of time to determine if there are updates to performance data related to the optimal server.

4. The computer-implemented method of claim 1, wherein identifying the plurality of servers is based on at least one of a geographical location of individual servers of the plurality of servers, server load information, or prior static knowledge of hop distances to the plurality of servers.

5. The computer-implemented method of claim 1, further comprising:
   receiving, from the optimal server, a second plurality of servers that includes at least one cache server not included in the plurality of servers; and
   in response to detecting an expiration of the lock-in period, determining a new lock-in period for the network client with respect to a second optimal server of the second plurality of servers.

6. The computer-implemented method of claim 5, wherein the second plurality of servers is identified by the optimal server based on at least one of a geographical location of each of the second plurality of servers, server load information, or prior static knowledge of hop distances to the second plurality of servers.

7. A system, comprising:
   a memory that stores computer-executable instructions; and
   at least one processor configured to access the memory, the at least one processor configured to execute the computer-executable instructions to collectively at least:
      receive a first request for an item of network content from a browser application installed on a network client;
      transmit, to a plurality of servers including a base sever and at least one cache server, a plurality of second requests for the item;
      receive, from at least a subset of the plurality of servers, at least two responses;
      determine, for individual responses of the at least two responses, a round trip latency for the response;

identify, based on the determined round trip latency, an optimal server of the subset of the plurality of servers corresponding with a shortest round trip latency; and instruct the browser application on the network client to transmit at least a third request for a subsequent item of network content to the optimal server for a determined lock-in period.

8. The system of claim 7, wherein the round trip latency for individual responses of the at least two responses is determined based on information included in the response.

9. The system of claim 7, wherein the round trip latency for individual responses of the at least two responses is determined based on a first time at which the plurality of second requests are transmitted and a second time at which each of the at least two responses are received.

10. The system of claim 7, wherein at least one of the at least two responses is received from the at least one cache server, and wherein at least another of the at least two responses is received from the base server.

11. The system of claim 7, wherein the round trip latency for individual responses of the at least two responses is stored as cookie information at the network client with respect to the browser application.

12. The system of claim 7, wherein the at least a third request includes all requests received from the network client during the lock-in period.

13. The system of claim 7, wherein the lock-in period for the optimal server is dynamically determined based on at least one of past web page load times experienced by the optimal server, the typical number of requests per second handled by the optimal server, or the typical load time experienced by the optimal server at various load levels.

14. A computer apparatus, comprising:

a processor; and a memory that stores computer-executable instructions, the computer-executable instructions configured to, when executed by the processor, cause the computer apparatus to:

receive, from a network client, a request for an item of network content;

identify a plurality of servers having access to the network content, the plurality of servers comprising at least a base server and one or more cache servers;

generate a content request for the item of network content;

transmit the content request for the item of network content to individual servers of the plurality of servers in parallel;

receive, from at least a subset of the plurality of servers, a plurality of responses to the content request that comprises at least a portion of the item of network content;

determine, for individual responses in the plurality of responses, a round trip latency for the content request based at least in part on an amount of time to receive the response;

determine that an optimal server of the plurality of servers is associated with a received response having a lowest round trip latency of the plurality of responses;

identify a lock-in period associated with the optimal server; and cause one or more subsequent requests received from the network client to be transmitted to the optimal server during the lock-in period.

15. The computer apparatus of claim 14, wherein the request for the item of network content is a search query received via a search engine.

16. The computer apparatus of claim 14, wherein the request for the item of network content is a web address received via an address bar.

17. The computer apparatus of claim 14, wherein the content request is a light-weight probe, and wherein the portion of the item of network content includes only a first several bytes of the item of network content.

18. The computer apparatus of claim 17, wherein the computer-executable instructions are further configured to cause the computer apparatus to submit a second content request to the optimal server to obtain the complete item of network content.

19. The computer apparatus of claim 18, wherein the second content request is submitted to the optimal server upon receiving an indication that a user of the network client has selected an indicator of the portion of the item of network content rendered on a webpage.

20. The computer apparatus of claim 14, wherein the item of network content is a webpage requested by a user of the network client.

* * * * *

UNITED STATES PATENT AND TRADEMARK OFFICE
CERTIFICATE OF CORRECTION

PATENT NO. : 10,021,210 B1
APPLICATION NO. : 15/815637
DATED : July 10, 2018
INVENTOR(S) : Infant Gerald Prasath Joseph It is certified that error appears in the above-identified patent and that said Letters Patent is hereby corrected as shown below:

In the Claims

Column 18, Line 59, Claim 7:
Delete: "transmit, to a plurality of servers including a base sever"
Insert: --transmit, to a plurality of servers including a base server--

Signed and Sealed this
Thirtieth Day of July, 2019

Andrei Iancu
*Director of the United States Patent and Trademark Office*